(12) United States Patent
Modeki (10) Patent No.: US 10,637,026 B2
(45) Date of Patent: *Apr. 28, 2020

(54) SEPARATOR FOR LITHIUM ION SECONDARY BATTERY AND LITHIUM ION SECONDARY BATTERY

(71) Applicant: NEC ENERGY DEVICES, LTD., Sagamihara-shi, Kanagawa (JP)

(72) Inventor: Akihiro Modeki, Kanagawa (JP)

(73) Assignee: Envision AESC Energy Devices, Ltd., Sagamihara-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/560,320

(22) PCT Filed: Feb. 3, 2016

(86) PCT No.: PCT/JP2016/053201
§ 371 (c)(1),
(2) Date: Sep. 21, 2017

(87) PCT Pub. No.: WO2016/152265
PCT Pub. Date: Sep. 29, 2016

(65) Prior Publication Data
US 2018/0053925 A1  Feb. 22, 2018

(30) Foreign Application Priority Data

Mar. 23, 2015 (JP) .................. 2015-059079

(51) Int. Cl.
*H01M 2/00* (2006.01)
*H01M 2/16* (2006.01)
(Continued)

(52) U.S. Cl.
CPC ......... *H01M 2/1653* (2013.01); *H01M 2/145* (2013.01); *H01M 2/16* (2013.01);
(Continued)

(58) Field of Classification Search
CPC .............. H01M 2/1653; H01M 2/145; H01M 10/0525; H01M 2/16; H01M 10/0566; H01M 10/052
See application file for complete search history.

(56) References Cited

U.S. PATENT DOCUMENTS 7,141,168 B2 * 11/2006 Sakamoto ............ B01D 67/002
                                                        210/500.36
2007/0269719 A1    11/2007 Sadamitsu et al.
(Continued)

FOREIGN PATENT DOCUMENTS

CN      1838471 A     9/2006
CN    102623658 A     8/2012
(Continued)

OTHER PUBLICATIONS

International Search Report for PCT/JP2016/053201, dated May 10, 2016 (PCT/ISA/210).
(Continued)

Primary Examiner — Nicholas P D'Anniello
(74) Attorney, Agent, or Firm — Sughrue Mion, PLLC (57) ABSTRACT

Provided is a separator for a lithium ion secondary battery includes a porous resin layer that contains polyolefin as a main component. In a spectrum obtained by X-ray diffraction using a CuKα-ray as a ray source, the separator has a diffraction peak (A) corresponding to a (111) crystal plane of the polyolefin.

7 Claims, 2 Drawing Sheets

(51) Int. Cl.
  *H01M 10/052* (2010.01)
  *H01M 10/0566* (2010.01)
  *H01M 2/14* (2006.01)
  *H01M 10/0525* (2010.01)

(52) U.S. Cl.
  CPC ..... *H01M 10/052* (2013.01); *H01M 10/0525* (2013.01); *H01M 10/0566* (2013.01)

(56) References Cited

U.S. PATENT DOCUMENTS

| | | | |
|---|---|---|---|
| 2009/0197158 A1* | 8/2009 | Ogawa | H01M 2/1653 429/144 |
| 2010/0227223 A1 | 9/2010 | Noumi et al. | |
| 2014/0093761 A1 | 4/2014 | Sakanaka et al. | |

FOREIGN PATENT DOCUMENTS

| | | |
|---|---|---|
| CN | 103094560 A | 5/2013 |
| JP | 11-339852 A | 12/1999 |
| JP | 2008-111134 A | 5/2008 |
| JP | 2008-222913 A | 9/2008 |
| JP | 2008-226703 A | 9/2008 |
| JP | 2009-1791 A | 1/2009 |
| JP | 2009-70620 A | 4/2009 |
| JP | 2012-129115 A | 7/2012 |
| WO | 2014/093519 A1 | 6/2014 |

OTHER PUBLICATIONS

ICCD Data (International Centre for Diffraction Data), 00-050-2397_α-Polypropylene (obtained Jan. 23, 2019); 2 pages.
ICCD Data (International Centre for Diffraction Data), 00-057-1845_⊕-Polypropylene (obtained Jan. 24, 2019); 1 page.
Extended European Search Report dated Oct. 23, 2018 issued by the European Patent Office in counterpart application No. 16768168.3.
Communication dated Aug. 19, 2019, from The National Intellectual Property Administration, P.R. China in counterpart Application No. 201680017839.3.

* cited by examiner

SEPARATOR FOR LITHIUM ION SECONDARY BATTERY AND LITHIUM ION SECONDARY BATTERY

CROSS REFERENCE TO RELATED APPLICATIONS

This application is a National Stage of International Application No. PCT/JP2016/053201 filed Feb. 3, 2016, claiming priority based on Japanese Patent Application No. 2015-059079, filed Mar. 23, 2015, the contents of all of which are incorporated herein by reference in their entirety.

TECHNICAL FIELD

The present invention relates to a separator for lithium ion secondary battery and a lithium ion secondary battery.

BACKGROUND ART

Examples of a separator that is used in a lithium ion secondary battery include a porous membrane that is mainly constituted by polyolefin. In the porous membrane, fine holes formed in the porous membrane are clogged in a case where an abnormal current occurs and a battery temperature rises, and the like. Accordingly, the porous membrane has a shut-down function of blocking a current flow. According to this, the porous membrane becomes effective from the viewpoint of avoiding battery thermal runaway.

Examples of a technology related to the separator for a lithium ion secondary battery include a technology described in Patent Document 1.

Patent Document 1 (Japanese Unexamined Patent Publication No. 2012-129115) discloses a separator for a non-aqueous electrolyte battery including a porous substrate which includes polyolefin having a characteristic viscosity of $5\times10^5$ Pa·s to $5\times10^6$ Pa·s and non-Newtonian flowability of 0.15 to 0.4, and in which the degree of crystallinity is 65% to 85%, and a heat-resistant porous layer that is provided on at least one surface of the porous substrate and includes a heat-resistant resin.

Patent Document 1 describes that the separator for the nonaqueous electrolyte battery has excellent mechanical strength and a shut-down function, and is excellent in short-circuit resistance at a high temperature.

RELATED DOCUMENT

Patent Document

[Patent Document 1] Japanese Unexamined Patent Publication No. 2012-129115

SUMMARY OF THE INVENTION

Technical Problem

However, recently, in a case where an abnormal current occurs in the lithium ion secondary battery having a high energy density, or a large-sized lithium ion secondary battery, there is a concern that a battery temperature may greatly rise more than ever, and the separator may be melted or may be fractured due to plasticization.

According to this, the separator for the lithium ion secondary battery is demanded to have more excellent short-circuit resistance.

The invention has been made in consideration of the above-described situations, and an object thereof is to provide a separator for a lithium ion secondary battery having excellent short-circuit resistance.

Solution to Problem

The present inventors have made a thorough investigation to realize a polyolefin-based separator having more excellent short-circuit resistance. As a result, they found that a separator that is constituted by polyolefin having a specific crystal structure is more excellent in short-circuit resistance, and they have accomplished the invention.

The invention is made on the basis of the above-described finding.

That is, according to the invention, there are provided a separator for a lithium ion secondary battery and a lithium ion secondary battery which are to be described below.

According to an aspect of the invention, there is provided a separator for a lithium ion secondary battery. The separator includes a porous resin layer that contains polyolefin as a main component. In a spectrum obtained by X-ray diffraction using a CuKα-ray as a ray source, the separator has a diffraction peak (A) corresponding to a (111) crystal plane of the polyolefin.

In addition, according to another aspect of the invention, there is provided a lithium ion secondary battery including, as components accommodated in a container: a positive electrode that intercalates and deintercalates lithium; a negative electrode that intercalates and deintercalates lithium; a nonaqueous electrolytic solution that contains a lithium salt; and a separator that is interposed between the positive electrode and the negative electrode. The separator is the separator for a lithium ion secondary battery according to the above-described aspect.

Advantageous Effects of Invention

According to the invention, it is possible to provide a separator for a lithium ion secondary battery having excellent short-circuit resistance, and a lithium ion secondary battery.

BRIEF DESCRIPTION OF THE DRAWINGS

The above and other objects, advantages and features of the present invention will be more apparent from the following description of certain preferred embodiments taken in conjunction with the accompanying drawings.

DESCRIPTION OF EMBODIMENTS

Hereinafter, description will be given of embodiments of the invention with reference to the accompanying drawings. Furthermore, in the drawings, the same reference numeral will be given to the same constituent element, and description thereof will not be repeated. In addition, in respective constituent elements in the drawings, a shape, a size, and a dispositional relationship are schematically illustrated to the extent capable of understanding the invention, and are different from real dimensions. In addition, "to" in a numerical range represents "equal to or greater than and equal to or less than" unless otherwise stated.

<Separator for Lithium Ion Secondary Battery>

A separator for a lithium ion secondary battery according to this embodiment includes a porous resin layer that contains polyolefin as a main component. In addition, in a spectrum obtained by X-ray diffraction using a CuKα-ray as a ray source, the separator has a diffraction peak (A) corresponding to a (111) crystal plane of polyolefin.

Here, the porous resin layer is formed from polyolefin that is a main component. Here, the "main component" represents a configuration in which a ratio of an arbitrary component in the porous resin layer is 50% by mass or greater, preferably 70% by mass or greater, and still more preferably 90% by mass or greater, or a configuration in which the ratio may be 100% by mass.

According to an investigation made by the present inventors, they found that that a separator for a lithium ion secondary battery, which has the diffraction peak (A) corresponding to a (111) crystal plane of the polyolefin in the spectrum obtained by X-ray diffraction using a CuKα ray as a ray source, has excellent short-circuit resistance.

That is, the present inventors have obtained the following finding for the first time. Specifically, presence or absence of the diffraction peak (A) corresponding to the (111) crystal plane of the polyolefin is effective as design guidelines for realizing a separator for a lithium ion secondary battery which has excellent short-circuit resistance.

The reason why the separator for a lithium ion secondary battery has excellent short-circuit resistance is not clear. However, the reason for this is considered to be because in the separator, a c-axis directional order of a polyolefin crystal is high, and melting or shrinkage of the separator is suppressed to the minimum. That is, the configuration in which the diffraction peak (A) corresponding to the (111) crystal plane of the polyolefin is provided is considered as a configuration in which the c-axis directional order of the polyolefin crystal is high. According to this, in a case where a battery temperature greatly rises, melting or shrinkage of the separator in the lithium ion secondary battery that is obtained is suppressed to the minimum, and it is considered that battery thermal runaway can be effectively suppressed.

Furthermore, the present inventors have confirmed that a separator in which the diffraction peak (A) is observed and a separator in which the diffraction peak (A) is not observed are not greatly different in porosity, thickness, air-permeability, and other crystal structures. That is, they have confirmed that presence or absence of the diffraction peak (A) in a spectrum obtained by X-ray diffraction is important.

To obtain the separator for a lithium ion secondary battery according to this embodiment, it is important to perform a post-treatment with respect to the polyolefin-based porous membrane.

Here, in this embodiment, diffraction peaks corresponding to respective crystal planes of the polyolefin can be identified by measuring X-ray diffraction spectrums by X-ray diffraction using a CuKα ray as a ray source, and comparing diffraction peaks with a known database. Examples of the known database include an ICDD database and the like.

Examples of the polyolefin that forms the porous resin layer include a polypropylene-based resin, a polyethylene-based resin, and the like.

The polypropylene-based resin is not particularly limited, and examples thereof include a propylene homopolymer, a copolymer of propylene and another olefin, and the like. Among these, the propylene homopolymer (homopolypropylene) is preferable. The polypropylene-based resin may be used alone or in combination of two or more kinds.

Furthermore, examples of the olefin that is copolymerized with the propylene include α-olefin such as ethylene, 1-butene, 1-pentene, 4-methyl-1-pentene, 1-hexene, 1-octene, 1-nonene, and 1-decene, and the like.

The polyethylene-based resin is not particularly limited, and examples thereof include an ethylene homopolymer, a copolymer of ethylene and another olefin, and the like. Among these, the ethylene homopolymer (homopolyethylene) is preferable. The polyethylene-based resin may be used alone or in combination of two or more kinds.

Furthermore, examples of the olefin that is copolymerized with the ethylene include α-olefin such as 1-butene, 1-pentene, 4-methyl-1-pentene, 1-hexene, 1-octene, 1-nonene, and 1-decene, and the like.

In a case where the polyolefin is the polypropylene-based resin, it is preferable that the separator for a lithium ion secondary battery according to this embodiment further has a diffraction peak (B1) corresponding to a (131) crystal plane of the polypropylene-based resin.

According to this, it is possible to further enhance the c-axis directional order of a polypropylene-based resin crystal, and in a case where the battery temperature greatly rises, it is possible to further suppress melting or shrinkage of the separator in a lithium ion secondary battery that is obtained.

In the separator for a lithium ion secondary battery according to this embodiment, typically, the diffraction peak (A) and the diffraction peak (B1) are located within a diffraction angle 2θ of 20° to 23°.

In addition, in the separator for a lithium ion secondary battery according to this embodiment, when diffraction intensity of the diffraction peak (A) corresponding to the (111) crystal plane of the polypropylene-based resin is set as $I_{111}$, and diffraction intensity of the diffraction peak corresponding to a (150) crystal plane of the polypropylene-based resin is set as $I_{150}$, a value of $I_{111}/I_{150}$ is preferably 0.2 or greater, and more preferably 0.3 or greater.

When the value of $I_{111}/I_{150}$ is equal to or greater than the lower limit, it is possible to further enhance the c-axis directional order of the polypropylene-based resin crystal, and in a case where the battery temperature greatly rises, it is possible to further suppress melting or shrinkage of the separator in a lithium ion secondary battery that is obtained.

Here, the diffraction peak corresponding to the (150) crystal plane of the polypropylene-based resin is a reference diffraction peak, and the diffraction peak (A) corresponding to the (111) crystal plane of the polypropylene-based resin is a diffraction peak that is strongly affected by the c-axis direction of the polypropylene-based resin crystal.

Accordingly, the value of $I_{111}/I_{150}$ represents an index of the c-axis directional order of the polypropylene-based resin crystal. As the value of $I_{111}/I_{150}$ is great, it can be understood that the c-axis directional order of the polypropylene-based resin crystal in the separator of this embodiment is high. Although not particularly limited, for example, the upper limit of the value of $I_{111}/I_{150}$ is 5.0 or less, and is preferably 2.0 or less.

A planar shape of the separator for a lithium ion secondary battery according to this embodiment can be appropriately selected in accordance with a shape of an electrode or a current collector without particular limitation, and examples of the planar shape include a rectangle.

The thickness of the porous resin layer is preferably 5 μm to 50 μm from the viewpoint of balance between mechanical strength and lithium ion conductivity, and more preferably 10 μm to 40 μm.

Porosity of the porous resin layer is preferably 30% to 60% from the viewpoint of the balance between the mechanical strength and the lithium ion conductivity, and more preferably 40% to 55%.

The porosity can be obtained from the following expression.

$$\varepsilon=\{1-Ws/(ds\cdot t)\}\times 100$$

Here, ε represents porosity (%), Ws represents a unit area (g/m$^2$), ds represents a true density (g/cm$^3$), and t represents a membrane thickness (μm).

Air-permeability of the porous resin layer is preferably 50 sec/100 cc to 400 sec/100 cc from the viewpoint of the balance between the mechanical strength and the lithium ion conductivity, and more preferably 100 sec/100 cc to 300 sec/100 cc.

Here, the air-permeability of the porous resin layer can be measured in conformity to JIS P8117.

It is preferable that the separator for a lithium ion secondary battery according to this embodiment further includes a ceramic layer on at least one surface of the porous resin layer from the viewpoint of improving heat resistance. When the separator for a lithium ion secondary battery according to this embodiment further includes the ceramic layer, it is possible to further reduce thermal shrinkage of the separator, and thus it is possible to further prevent short-circuiting between electrodes.

For example, the ceramic layer can be formed by applying a ceramic layer forming material on the porous resin layer and drying the applied material. As the ceramic layer forming material, for example, a material obtained by dissolving or dispersing an inorganic filler and a binding agent in an appropriate solvent can be used.

The inorganic filler that is used in the ceramic layer can be appropriately selected among known materials which are used in a separator of a lithium ion secondary battery. For example, an oxide, a nitride, a sulfide, a carbide, and the like, which have high insulating properties, are preferable, and materials, which are obtained by adjusting one kind or two or more kinds of inorganic compounds selected from oxide-based ceramics such as titanium oxide, alumina, silica, magnesia, zirconia, zinc oxide, iron oxide, ceria, and yttria into a particle shape, are more preferable. Among these, the titanium oxide and the alumina are preferable.

The binding agent is not particularly limited, and examples thereof include a cellulose-based resin such as carboxymethyl cellulose (CMC); an acryl-based resin; a fluorine-based resin such as polyvinylidene fluoride (PVDF); and the like. The binding agent may be used alone or in combination of two or more kinds.

The solvent that dissolves or disperses the components is not particularly limited, and may be appropriately selected from water, alcohols such as ethanol, N-methylpyrrolidone (NMP), toluene, dimethyl carbonate (DMC), ethylmethyl carbonate (EMC), and the like.

The thickness of the ceramic layer is preferably 1 μm to 20 μm from the viewpoint of the balance between the mechanical strength, handability, and lithium ion conductivity, and more preferably 1 μm to 12 μm.

<Method of Manufacturing Separator for Lithium Ion Secondary Battery>

Next, description will be given of a method of manufacturing the separator for a lithium ion secondary battery according to this embodiment. To obtain the separator for a lithium ion secondary battery according to this embodiment, it is important to perform a post-treatment with respect to the polyolefin-based porous membrane.

For example, the separator for a lithium ion secondary battery according to this embodiment can be obtained by irradiating the polyolefin-based porous membrane with ultraviolet rays at a high temperature.

Here, the irradiation of polyolefin-based porous membrane with the ultraviolet rays is also performed in the related art. However, in this embodiment, an ultraviolet irradiation temperature is controlled with accuracy. To obtain the separator for a lithium ion secondary battery according to this embodiment, it is important to control the ultraviolet irradiation temperature with accuracy.

Hereinafter, an example of the method of manufacturing the separator for a lithium ion secondary battery according to this embodiment will be described. However, the method of manufacturing the separator for a lithium ion secondary battery according to this embodiment is not limited to the following example.

For example, the separator for a lithium ion secondary battery according to this embodiment can be obtained by a manufacturing method including the following processes (1) to (3).

(1) The polyolefin-based porous membrane is prepared.

(2) The polyolefin-based porous membrane is impregnated with a photo initiator.

(3) Irradiation with ultraviolet rays having a wavelength distribution of 240 to 400 nm at a high temperature is performed.

First, (1) the polyolefin-based porous membrane is prepared. As the polyolefin-based porous membrane, for example, a membrane that is formed by the above-described polyolefin can be used.

Examples of a type of the polyolefin-based porous membrane include a membrane, a film, non-woven fabric, and the like. In addition, a commercially available polyolefin-based porous membrane may be used.

Next, (2) the polyolefin-based porous membrane is impregnated with the photo initiator. The photo initiator is not particularly limited, and examples thereof include benzophenon-based initiator such as benzophenone and methyl benzoylbenzoic acid; alkyl phenone-based initiator such as benzoine ether, benzyl dimethyl ketal, and α-hydroxyalkyl phenon; acylphosphine oxide; and the like.

Examples of a photo initiator impregnation method include a method in which a solution that contains the photo initiator is applied onto the polyolefin-based porous membrane, a method in which the polyolefin-based porous membrane is immersed in the solution that contains the photo initiator, and the like. For example, the amount of the photo initiator that is added is 0.1% by mass to 3% by mass on the basis of the polyolefin-based porous membrane.

In addition, an organic solvent that is used when preparing the solution that contains the photo initiator is not particularly limited, and for example, acetone, methylethylketone, toluene, methanol, ethanol, hexane, and the like can be used.

Next, (3) irradiation with ultraviolet rays having a wavelength distribution of 240 to 400 nm at a high temperature is performed. For example, an ultraviolet ray irradiation temperature is preferably 80° C. to 120° C. An irradiation amount of ultraviolet rays is appropriately set in accordance with the thickness of the polyolefin-based porous membrane, and is not particularly limited. With regard to the irradiation amount, it is preferable that an illuminance peak is set to 20 mW/cm$^2$ or greater, and the amount of light is set to 50 mJ/cm$^2$ or greater.

According to this, the c-axis directional order of the polyolefin crystal can be enhanced.

According to the above-described procedure, the separator for a lithium ion secondary battery of this embodiment can be obtained.

<Lithium Ion Secondary Battery>

A lithium ion secondary battery according to this embodiment includes the following configuration.

The lithium ion secondary battery includes, as components accommodated in a container, a positive electrode that intercalates and deintercalates lithium, a negative electrode that intercalates and deintercalates lithium, a nonaqueous electrolytic solution that contains a lithium salt, and a separator that is interposed between the positive electrode and the negative electrode. The separator is the separator for a lithium ion secondary battery according to this embodiment.

A type or kind of the lithium ion secondary battery of this embodiment is not particularly limited, and the following configuration may be employed as an example.

[Laminated Battery]

Figure 1:
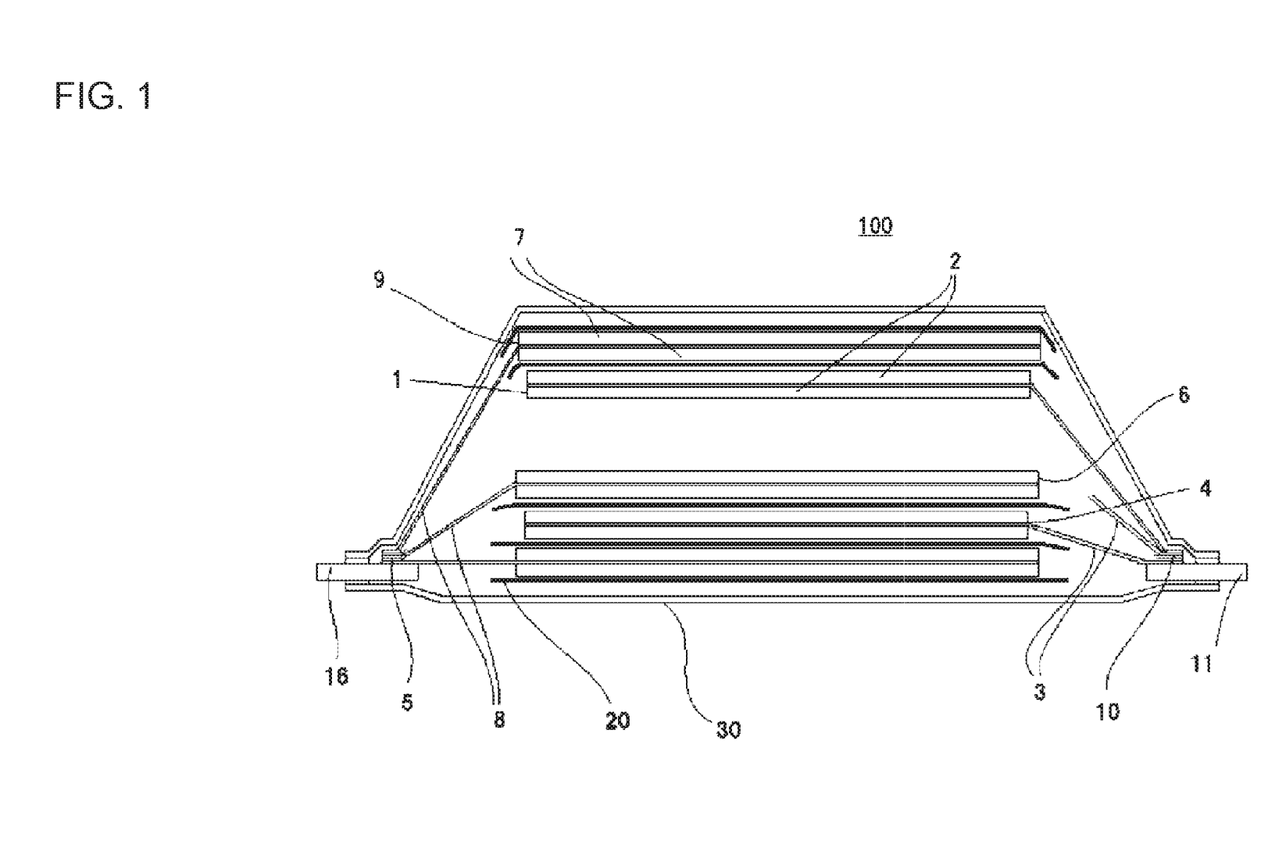
FIG. 1 is a schematic view illustrating an example of a laminated battery in this embodiment.

FIG. 1 schematically illustrates a configuration of a laminated battery. A laminated battery 100 includes a battery element in which a positive electrode 1 and a negative electrode 6 are alternately laminated in a plurality of layers through a separator 20. The battery element is accommodated in a container constituted by a flexible film 30 in combination with an electrolytic solution (not illustrated). A positive electrode terminal 11 and a negative electrode terminal 16 are electrically connected to the battery element, and a part or the entirety of the positive electrode terminal 11 and the negative electrode terminal 16 are lead out to the outside of the flexible film 30.

A positive electrode active material applied portion 2 and a positive electrode active material non-applied portion are respectively provided on a front surface and a rear surface of a positive electrode current collector 3 in the positive electrode 1, and a negative electrode active material applied portion 7 and a negative electrode active material non-applied portion are provided on a front surface and a rear surface of the negative electrode current collector 8 in the negative electrode.

The positive electrode active material non-applied portion in the positive electrode current collector 3 is set as a positive electrode tab 10 for connection with the positive electrode terminal 11, and the negative electrode active material non-applied portion in the negative electrode current collector 8 is set as a negative electrode tab 5 for connection with the negative electrode terminal 16.

A plurality of the positive electrode tabs 10 are collected on the positive electrode terminal 11 and are connected to each other in combination with the positive electrode terminal 11 through ultrasonic welding and the like, and a plurality of the negative electrode tabs 5 are collected on the negative electrode terminal 16 and are connected to each other in combination with the negative electrode terminal 16 through the ultrasonic welding and the like. In addition, one end of the positive electrode terminal 11 is lead-out to the outside of the flexible film 30, and one end of the negative electrode terminal 16 is also lead-out to the outside of the flexible film 30.

An insulating member may be formed at a boundary 4 between the positive electrode active material applied portion 2 and the positive electrode active material non-applied portion as necessary, and the insulating member may be formed not only at the boundary 4 but also in the vicinity of a boundary between the positive electrode tab 10 and the positive electrode active material.

Similarly, the insulating member may also be formed at a boundary 9 between the negative electrode active material applied portion 7 and the negative electrode active material non-applied portion as necessary, and the insulating member may be formed in the vicinity of a boundary between the negative electrode tab 5 and the negative electrode active material.

Typically, external dimensions of the negative electrode active material applied portion 7 are greater than external dimensions of the positive electrode active material applied portion 2 and are smaller than external dimensions of the separator 20.

[Wound Battery]

Figure 2:
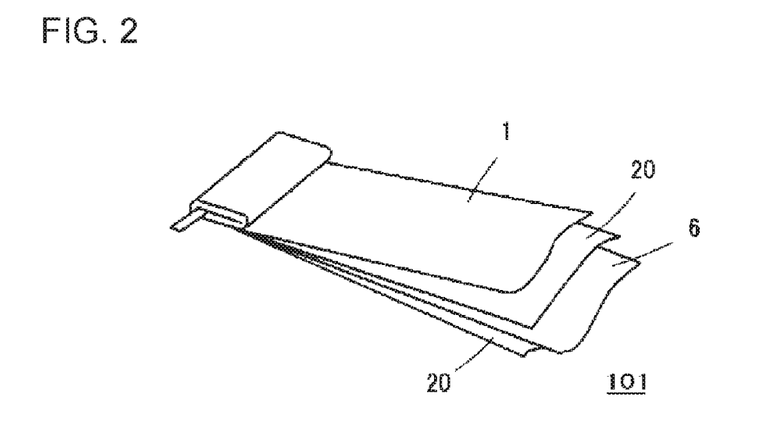
FIG. 2 is a schematic view illustrating an example of a wound battery in this embodiment.

FIG. 2 schematically illustrates a configuration of a wound battery, and a container and the like are not illustrated. A wound battery 101 includes a battery element in which a positive electrode 1 and a negative electrode 6 are laminated through a separator 20, and which is wound. The battery element is accommodated in a container constituted by a flexible film in combination with an electrolytic solution (not illustrated).

The other configurations such as a configuration, in which a positive electrode terminal and a negative electrode terminal are electrically connected to the battery element of the wound battery 101, are approximately the same as those in the laminated battery 100, and thus description thereof will not be repeated.

Next, description will be given of respective configurations which are used in the lithium ion secondary battery of this embodiment.

(Positive Electrode that Intercalates and Deintercalates Lithium)

The positive electrode 1 that is used in this embodiment can be appropriately selected among positive electrodes which can be used in a known lithium ion secondary battery in accordance with a use and the like. As an active material that can be used in the positive electrode 1, it is preferable to use a material which can reversibly intercalate and deintercalate lithium ions and has high electron conductivity so that electron transport can be easily performed.

Examples of the active material that is used in the positive electrode 1 include composite oxides between lithium and a transition metal such as a lithium nickel composite oxide, a lithium cobalt composite oxide, a lithium manganese composite oxide, and a lithium-manganese-nickel composite oxide; transition metal sulfides such as $TiS_2$, $FeS$, and $MoS_2$; transition metal oxides such as MnO, $V_2O_5$, $V_6O_{13}$, and $TiO_2$; olivine type lithium phosphorous oxides; and the like.

For example, the olivine type lithium phosphorous oxides include at least one kind of element selected from the group consisting of Mn, Cr, Co, Cu, Ni, V, Mo, Ti, Zn, Al, Ga, Mg, B, Nb, and Fe, lithium, phosphorus, and oxygen. In the compounds, partial elements may be partially substituted with other elements to improve characteristics.

Among the compounds, olivine type lithium iron phosphides, lithium cobalt composite oxides, lithium nickel composite oxides, lithium manganese composite oxides, lithium-manganese-nickel composite oxides are preferable. The positive electrode active material has a large capacity and a large energy density in addition to a high action potential.

The positive electrode active materials may be used alone or in combination of two or more kinds.

A binding agent, a conductive agent, and the like can be appropriately added to the positive electrode active material. As the conductive agent, carbon black, a carbon fiber, graphite, and the like can be used. In addition, as the binding agent, polyvinylidene fluoride (PVdF), polytetrafluoroethylene (PTFE), carboxymethyl cellulose, modified acrylonitrile rubber particles, and the like can be used.

As the positive electrode current collector 3 that is used in the positive electrode 1, aluminum, stainless steel, nickel, titanium, alloys thereof, and the like can be used, and among these, aluminum is particularly preferable.

In addition, the positive electrode 1 in this embodiment can be manufactured by a known method. For example, it is possible to employ a method in which the positive electrode active material, the conductive agent, and the binding agent are dispersed in an organic solvent to obtain slurry, and the slurry is applied to the positive electrode current collector 3 and is dried.

(Negative Electrode that Intercalates and Deintercalates Lithium)

The negative electrode 6 that is used in this embodiment can be appropriately selected among negative electrodes which can be used in a known lithium ion secondary battery in accordance with a used and the like. An active material that is used in the negative electrode 6 can also be appropriately set in accordance with the use and the like as long as the active material can be used in a negative electrode.

Specific examples of a material that can be used as the negative electrode active material include carbon materials such as artificial graphite, natural graphite, amorphous carbon, diamond-like carbon, fullerene, a carbon nanotube, and a carbon nanohorn; lithium metal materials; alloy-based materials of silicon, tin, and the like; oxide-based materials such as $Nb_2O_5$ and $TiO_2$; and composite materials thereof.

The negative electrode active materials may be used alone or in combination of two or more kinds.

In addition, as is the case with the positive electrode active materials, a binding agent, a conductive agent, and the like can be appropriately added to the negative electrode active materials. The same binding agent and the same conductive agent, which are added to the positive electrode active materials, can be used.

As the negative electrode current collector 8, copper, stainless steel, nickel, titanium, or alloys thereof can be used, and among these, copper is particularly preferable.

In addition, the negative electrode 6 in this embodiment can be manufactured by a known method. For example, it is possible to employ a method in which the negative electrode active material and the binding agent are dispersed in an organic solvent to obtain slurry, and the slurry is applied to the negative electrode current collector 8 and is dried.

(Nonaqueous Electrolytic Solution that Contains Lithium Salt)

A nonaqueous electrolytic solution that is used in this embodiment and contains a lithium salt may be appropriately selected among known nonaqueous electrolytic solutions in accordance with the kind of active materials, a use of the lithium ion secondary battery, and the like.

Specific examples of the lithium salt include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiC_4F_9SO_3$, $Li(CF_3SO_2)_2N$, a lower fatty acid lithium carboxylate, and the like.

A solvent that dissolves the lithium salt is not particularly limited as long as the lithium salt is typically used as a liquid that dissolves an electrolyte, and examples of the solvent include carbonates such as ethylene carbonate (EC), propylene carbonate (PC), butylene carbonate (BC), dimethyl carbonate (DMC), diethyl carbonate (DEC), methyl ethyl carbonate (MEC), and vinylene carbonate (VC); lactones such as γ-butyrolactone and γ-valerolactone; ethers such as trimethoxymethane, 1,2-dimethoxyethane, diethyl ether, tetrahydrofuran, and 2-methyltetrahydrofuran; sulfoxides such as dimethylsulfoxide; oxolanes such as 1,3-dioxolane, and 4-methyl-1,3-dioxolane; nitrogen-containing solvents such as acetonitrile, nitromethane, formamide, and dimethyl formamide; organic acid esters such as methyl formate, methyl acetate, ethyl acetate, butyl acetate, methyl propionate, and ethyl propionate; phosphoric acid triester or diglymes; triglymes; sulpholanes such as sulpholane and methyl sulfolane; oxazolidinones such as 3-methyl-2-oxazolidinone; sultones such as 1,3-propane sultone, 1,4-butane sultone, and naphthyl sultone; and the like. These solvents may be used alone or in combination of two or more kinds.

(Container)

As the container in this embodiment, a known member may be used, and it is preferable to use the flexible film 30 from the viewpoint of a reduction in weight of the battery. As the flexible film 30, a member, in which a resin layer is provided on front and rear surfaces of a metal layer that is a substrate, may be used. As the metal layer, a material having a barrier property of preventing leakage of an electrolytic solution and intrusion of moisture from the outside can be selected, and aluminum, stainless steel, and the like can be used. A thermally fusible resin layer such as modified polyolefin is provided on at least one surface of the metal layer. Parts of the thermally fusible resin layer of the flexible film 30 are made to face each other through the battery element, and the periphery of a portion, in which the battery element is accommodated, is thermally welded to form an exterior package. A resin layer such as a nylon film and a polyester film may be provided on an exterior package surface that is opposite to the surface on which the thermally fusible resin layer is formed.

(Terminal)

In this embodiment, a terminal formed from aluminum or an aluminum alloy may be used as the positive electrode terminal 11, and a terminal formed from copper, a copper alloy, nickel-coated copper, or a nickel-coated copper alloy, and the like may be used as the negative electrode terminal 16. The respective terminals are lead-out to the outside of the container, and a thermally fusible resin may be provided in advance at a site located at a portion, in which the periphery of the exterior package is thermally fused, of the respective terminals.

(Insulating Member)

In a case of forming the insulating member at the boundaries 4 and 9 between the active material applied portion and the active material non-applied portion, polyimide, a glass fiber, polyester, polypropylene, or material that contains these materials may be used. The insulating member may be welded to the boundaries 4 and 9 by applying heat to the insulating member, or a gel-like resin may be applied to the boundaries 4 and 9 and may be dried to form the insulating member.

(Separator)

As a separator, the separator for a lithium ion secondary battery according to this embodiment is used. Description thereof will not be repeated.

Hereinbefore, the invention has been described on the basis of the embodiment, but the embodiment is illustrative only, and various configuration other than the above-described configuration can be employed.

In addition, the invention is not limited to the above-described embodiment, and it should be understood that modifications, improvements, and the like in the scope capable of achieving the object of the invention are included in the invention.

EXAMPLES

Hereinafter, the invention will be described with reference to Examples and Comparative Examples, but the invention is not limited thereto.

Example 1

<Preparation of Positive Electrode>

A composite oxide, which contains $LiMn_2O_4$ and $LiNi_{0.8}Co_{0.1}Al_{0.1}O_2$ as a main component, was used as the positive electrode active material. Carbon black was used as the conductive agent, and polyvinylidene fluoride (PVdF) was used as the binding agent. These materials were dispersed in an organic solvent to prepare slurry. The slurry was continuously applied onto aluminum foil having a thickness of 20 μm as the positive electrode current collector and was dried to prepare a positive electrode roll including the positive electrode current collector applied portion and the positive electrode current collector non-applied portion.

The positive electrode roll is punched in dimensions of 15.2 mm (vertical) and 10.2 mm (horizontal) excluding the positive electrode tab in a state in which the non-applied portion is left as the tab for connection with a positive electrode terminal, and the punched positive electrode roll was set as a positive electrode.

<Preparation of Negative Electrode>

Artificial graphite was used as the negative electrode active material, and polyvinylidene fluoride (PVdF) was used as the binding agent. These materials were dispersed in an organic solvent to prepare slurry. The slurry was continuously applied onto copper foil having a thickness of 15 μm as the negative electrode current collector, and was dried to prepare a negative electrode roll including the negative electrode current collector applied portion and the negative electrode current collector non-applied portion.

The negative electrode roll is punched in dimensions of 15.6 mm (vertical) and 10.6 mm (horizontal) excluding the negative electrode tab in a state in which the non-applied portion is left as the tab for connection with a negative electrode terminal, and the punched negative electrode roll was set as a negative electrode.

<Preparation of Separator>

A polypropylene porous membrane having a thickness of 25 μm, porosity of 44%, and air-permeability of 252 sec/100 cc was immersed in a benzophenone/hexane solution having a concentration of 1% by mass for one minute, and was dried with wind.

Then, front and rear surfaces of the porous membrane were irradiated with ultraviolet rays at 100° C. for 10 seconds by using an ultraviolet irradiation apparatus. As an ultraviolet lamp, a high-pressure mercury lamp (120 W/cm$^2$) was used.

According to the processes, the separator 1 was obtained.

<Preparation of Laminated Battery>

The positive electrode and the negative electrode were laminated through the separator, and the negative electrode terminal and the positive electrode terminal were respectively provided to the positive electrode and the negative electrode to obtain a laminated body. Then, an electrolytic solution obtained by dissolving $LiPF_6$ having a concentration of 1 M in a solvent composed of ethylene carbonate and diethyl carbonate, and the obtained laminated body were accommodated in the flexible film to obtain a laminated battery illustrated in FIG. 1.

<Evaluation>

(1) Porosity of Separator

The porosity of the separator was obtained from the following expression.

$$\varepsilon = \{1 - Ws/(ds \cdot t)\} \times 100$$

Here, ε represents porosity (%), Ws represents a unit area (g/m$^2$), ds represents a true density (g/cm$^3$), and t represents a membrane thickness (μm).

(2) Air-permeability of Separator

The air-permeability of the separator was measured in conformity to JIS P8117.

(3) X-Ray Diffraction Analysis

An X-ray diffraction spectrum of the obtained separator was obtained through X-ray diffraction analysis by using an X-ray diffraction apparatus. From the X-ray diffraction spectrum that was obtained, presence or absence of diffraction peaks of respective crystal planes and the intensity of the diffraction peaks were determined with reference to a known database (ICDD database). In addition, the CuKα ray was used as the ray source.

Here, the value of $I_{111}/I_{150}$ was calculated from the X-ray diffraction spectrum of the separator. When the value of $I_{111}/I_{150}$ was 0.2 or greater, evaluation was made as "B". In addition, diffraction intensity of the diffraction peak (A) corresponding to the (111) crystal plane of polypropylene was set as $I_{111}$, and diffraction intensity of the diffraction peak corresponding to a (150) crystal plane of polypropylene was set as $I_{150}$.

(4) Nail Penetration Test

In a full charge state, a metal nail having a diameter of 3 mm penetrated through the central portion of the laminated battery at 80 mm/sec for short-circuiting of the laminated battery.

Then, short-circuit resistance of the separator was evaluated on the basis of the following reference.

A: Cell temperature rise from a test temperature was equal to or higher than 0° C. and lower than 20° C.

B: Cell temperature rise from the test temperature was equal to or higher than 20° C. and lower than 50° C.

C: Cell temperature rise from the test temperature was equal to or higher than 50° C.

The above-described evaluation results are illustrated in Table 1.

Example 2

A separator and a laminated battery were prepared in the same manner as in Example 1 except that a polypropylene porous membrane having a thickness of 25 μm, porosity of 53%, and air-permeability of 192 sec/100 cc was used as the porous membrane used to prepare the separator, and respective evaluations were made. Respective evaluation results are illustrated in Table 1.

Comparative Example 1

A separator and a laminated battery were prepared in the same manner as in Example 1 except that a polypropylene porous membrane having a thickness of 25 μm, porosity of 43%, and air-permeability of 180 sec/100 cc was used as the porous membrane used to prepare the separator, and the ultraviolet irradiation temperature during preparation of the separator was changed to 40° C., and respective evaluations were made. Respective evaluation results are illustrated in Table 1.

Comparative Example 2

A laminated battery was prepared in the same manner as in Example 1 except that a polypropylene porous membrane having a thickness of 25 μm, porosity of 51%, and air-permeability of 149 sec/100 cc was used as the separator, and respective evaluations were made. In addition, as the separator in Comparative Example 2, the polypropylene porous membrane was used as it was without performing immersion in the benzophenone/hexane solution and the ultraviolet irradiation. Respective evaluation results are illustrated in Table 1.

TABLE 1

|  | Thickness [μm] | Porosity [%] | Air-permeability [sec/100 cc] | Presence or absence of diffraction peak (A) | Presence or absence of diffraction peak (B1) | $I_{111}/I_{150}$ [—] | Nail penetration test |
|---|---|---|---|---|---|---|---|
| EXAMPLE 1 | 25 | 44 | 252 | Presence | Presence | B | A |
| EXAMPLE 2 | 25 | 53 | 192 | Presence | Presence | B | B |
| COMPARATIVE EXAMPLE 1 | 25 | 43 | 180 | Absence | Absence | — | C |
| COMPARATIVE EXAMPLE 2 | 25 | 51 | 149 | Absence | Absence | — | C |

Priority is claimed on Japanese Patent Application No. 2015-059079, filed Mar. 23, 2015, the content of which is incorporated herein by reference.

The invention claimed is:

1. A separator for a lithium ion secondary battery, comprising:
a porous resin layer that contains only a polypropylene resin as a resin component,
wherein in a spectrum obtained by X-ray diffraction using a CuKα-ray as a ray source, the separator has a diffraction peak (A) corresponding to a (111) crystal plane of the polypropylene resin,
the separator further has a diffraction peak (B1) corresponding to a (−131) crystal plane of the polypropylene resin, and
wherein the diffraction peak (A) and the diffraction peak (B1) are located within a diffraction angle 2θ of 20° to 23° wherein a diffraction intensity of the diffraction peak (A) corresponding to the (111) crystal plane of the polypropylene resin is set as $I_{111}$, and a diffraction intensity of the diffraction peak corresponding to a (150) crystal plane of the polypropylene resin is set as $I_{150}$, and
a value of $I_{111}/I_{150}$ is 0.2 or greater.

2. The separator for a lithium ion secondary battery according to claim 1, further comprising:
a ceramic layer that is provided on at least one surface of the porous resin layer.

3. The separator for a lithium ion secondary battery according to claim 1,
wherein the thickness of the porous resin layer is 5 μm to 50 μm.

4. The separator for a lithium ion secondary battery according to claim 1,
wherein air-permeability of the porous resin layer is 50 sec/100 cc to 400 sec/100 cc.

5. The separator for a lithium ion secondary battery according to claim 1,
wherein porosity of the porous resin layer is 30% to 60%.

6. A lithium ion secondary battery, comprising, as components accommodated in a container:
a positive electrode that intercalates and deintercalates lithium;
a negative electrode that intercalates and deintercalates lithium;
a nonaqueous electrolytic solution that contains a lithium salt; and
a separator that is interposed between the positive electrode and the negative electrode,
wherein the separator is the separator for a lithium ion secondary battery according to claim 1.

7. The separator for a lithium ion secondary battery according to claim 1,
wherein the polypropylene resin is an alpha-crystalline-polypropylene resin.

* * * * *